United States Patent
Cai (10) Patent No.: US 12,328,797 B2
(45) Date of Patent: Jun. 10, 2025

(54) RADIO ACCESS NETWORK (RAN) DATA EXPOSURE IN A WIRELESS COMMUNICATION NETWORK

(71) Applicant: T-MOBILE INNOVATIONS LLC, Overland Park, KS (US)

(72) Inventor: Zheng Cai, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/456,342

(22) Filed: Aug. 25, 2023

(65) Prior Publication Data

US 2023/0403551 A1 Dec. 14, 2023

Related U.S. Application Data (63) Continuation of application No. 17/343,007, filed on Jun. 9, 2021, now Pat. No. 11,778,453.

(51) Int. Cl.
*H04W 8/24* (2009.01)
(52) U.S. Cl.
CPC .................. *H04W 8/24* (2013.01)
(58) Field of Classification Search
CPC ........ H04L 67/10; H04W 8/24; H04W 24/02; Y02D 30/70
See application file for complete search history.

(56) References Cited

U.S. PATENT DOCUMENTS

| | | | |
|---|---|---|---|
| 10,524,166 B2 | 12/2019 | Youn et al. | |
| 10,673,618 B2 | 6/2020 | Suthar et al. | |
| 10,856,217 B1 | 12/2020 | Young et al. | |
| 10,863,494 B2 | 12/2020 | Zhang et al. | |
| 10,992,396 B1 * | 4/2021 | Nahata | H04B 17/104 |
| 11,329,737 B1 | 5/2022 | Khafizov et al. | |
| 2017/0332421 A1 | 11/2017 | Sternberg et al. | |
| 2018/0262924 A1 | 9/2018 | Dao et al. | |
| 2019/0149365 A1 | 5/2019 | Chatterjee et al. | |
| 2019/0174449 A1 | 6/2019 | Shan et al. | |
| 2019/0387440 A1 | 12/2019 | Yiu et al. | |

(Continued)

OTHER PUBLICATIONS

QUALCOMM Incorporated; "NWDAF Decompose Architecture"; 3GPP S2-2003862; Jun. 2020; pp. 1-4; SA WG2 Meeting #139E; 3GPP; Sophia Antipolis, France.

(Continued)

*Primary Examiner* — Congvan Tran (57) ABSTRACT

A wireless communication network provides a wireless communication service to a User Equipment (UE) responsive to an Application Server (AS) that is external to the wireless communication network. A Network Exposure Function (NEF) receives a Radio Access Network (RAN) instruction from the AS. The RAN instruction controls the wireless communication service for the UE. The NEF transfers the RAN instruction to the RAN. The RAN receives the RAN instruction and delivers the wireless communication service to the UE based on the RAN instruction from the AS. The RAN transfers RAN information that characterizes the RAN delivery of the wireless communication service to the UE based on the RAN instruction from the AS. The NEF receives the RAN information and transfers the RAN information to the AS that is external to the wireless communication network.

20 Claims, 9 Drawing Sheets

(56) References Cited

U.S. PATENT DOCUMENTS

| | | | |
|---|---|---|---|
| 2020/0106536 A1 | 4/2020 | Bedekar | |
| 2020/0383040 A1 | 12/2020 | Young et al. | |
| 2021/0144071 A1 | 5/2021 | Young et al. | |
| 2021/0184989 A1* | 6/2021 | Wu | H04L 47/822 |
| 2021/0204148 A1* | 7/2021 | Chou | H04W 24/02 |
| 2021/0234648 A1 | 7/2021 | Parekh et al. | |
| 2021/0258866 A1* | 8/2021 | Chou | H04W 48/16 |
| 2021/0258969 A1 | 8/2021 | Yang et al. | |
| 2021/0337420 A1 | 10/2021 | Lo et al. | |
| 2022/0086679 A1 | 3/2022 | Briggs | |
| 2022/0159525 A1 | 5/2022 | Chou et al. | |
| 2022/0210709 A1 | 6/2022 | Parekh et al. | |
| 2022/0279424 A1 | 9/2022 | Yang et al. | |
| 2022/0311498 A1* | 9/2022 | Loehr | H04B 7/088 |
| 2022/0329995 A1* | 10/2022 | Venkata | H04W 4/50 |
| 2022/0330038 A1* | 10/2022 | Ganesan | H04W 52/383 |
| 2022/0377751 A1 | 11/2022 | Kotaru et al. | |
| 2022/0394540 A1* | 12/2022 | Ahmadi | H04L 41/12 |
| 2022/0408242 A1 | 12/2022 | Sun | |
| 2024/0193021 A1* | 6/2024 | Pateromichelakis | H04L 43/10 |

OTHER PUBLICATIONS

"3rd Generation Partnership Project; Technical Specification Group Services and System Aspects; Architecture enhancements for 5G System (5GS) to support network data analytics services (Release 16)"; 3GPP TS 23.288; Jun. 2021; pp. 1-67; V16.8.0; 3GPP; Sophia Antipolis, France.

* cited by examiner

FIGURE 9 ously expose the RAN data.

RADIO ACCESS NETWORK (RAN) DATA EXPOSURE IN A WIRELESS COMMUNICATION NETWORK

RELATED CASES

This United States Patent Application is a continuation of U.S. patent application Ser. No. 17/343,007 that was filed on Jun. 9, 2021 and is entitled "RADIO ACCESS NETWORK (RAN) DATA EXPOSURE IN A WIRELESS COMMUNICATION NETWORK." U.S. patent application Ser. No. 17/343,007 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes comprise Radio Units (RUs), Distributed Units (DUs), and Centralized Units (CUs) that are grouped into Radio Access Networks (RANs). The RUs are often mounted at elevation and are coupled to the DUs which are housed in a nearby shelter. The DUs are coupled to the CUs which reside in edge data centers. The CUs configure the RUs and DUs to serve the wireless user devices. The CUs exchange network signaling with the wireless user devices to perform wireless attachment. The CUs exchange network signaling with the wireless user devices and with one another to perform device handovers for the mobile wireless user devices. The CUs exchange network signaling with one another to manage their radio interference. The CUs in the RANs exchange network signaling and user data with network elements that are clustered in wireless network cores.

RAN Intelligent Controllers (RICs) execute X-applications to control mobility, admission, and interference in the RANs. The RICs include near-Real Time (near-RT) RICs and non-Real Time (non-RT) RICs. The near-RT RICs reside in the RANs and exert some control over the CUs and the DUs responsive to the X-applications. The non-RT RICs typically reside in the wireless network cores and exert control over the near-RT RICs responsive to service policy, ML model and enrichment information. The RICs use open technology to improve the availability and functionality of RAN capabilities like mobility, admission, and interference mitigation.

In the wireless network cores, the network elements comprise Access and Mobility Management Functions (AMFs), Session Management Functions (SMFs), User Plane Functions (UPFs), Network Exposure Functions (NEFs), Application Functions (AFs), and the like. The AMFs authenticate the wireless user devices and authorize one or more wireless data services for the authentic wireless user devices. The AMFs direct the RANs and the SMFs to deliver the authorized wireless data services to the wireless user devices. The SMFs control the wireless data services which are delivered by the UPFs. The user data flows between the wireless user devices and external data systems over the RUs, DUs, CUs, and UPFs.

The NEFs expose network capabilities and events to the network elements. For example, an AMF may report an attachment event for a wireless user device to the NEF, and the NEF may expose the attachment event to an AF in response to an event subscription for that wireless user device. The AF may be linked to an external Application Server (AS) that is operated by a home network or a virtual network for the wireless user device. Unfortunately, the RICs and the NEFs do not effectively interact. Moreover, the external AS does not efficiently control the wireless data services for the wireless user devices through the NEFs and RICs.

Technical Overview

In some examples, a wireless communication network provides a wireless communication service to a User Equipment (UE) responsive to an Application Server (AS) that is external to the wireless communication network. A Network Exposure Function (NEF) receives a Radio Access Network (RAN) instruction from the AS. The RAN instruction controls the wireless communication service for the UE. The NEF transfers the RAN instruction to the RAN. The RAN receives the RAN instruction and delivers the wireless communication service to the UE based on the RAN instruction from the AS. The RAN transfers RAN information that characterizes the RAN delivery of the wireless communication service to the UE based on the RAN instruction from the AS. The NEF receives the RAN information and transfers the RAN information to the AS that is external to the wireless communication network.

In some examples, a wireless communication network provides a wireless communication service to a UE. A NEF receives a service instruction for the UE from a data system. The NEF transfers the service instruction to a Radio Access Network Intelligent Controller (RIC). The RIC receives the service instruction and executes an X-application based on the service instruction to deliver the wireless communication service to the UE. The RIC transfers service information that characterizes the delivery of the wireless communication service to the UE. The NEF receives the service information and exposes the service information to the data system.

DETAILED DESCRIPTION

Figure 1:
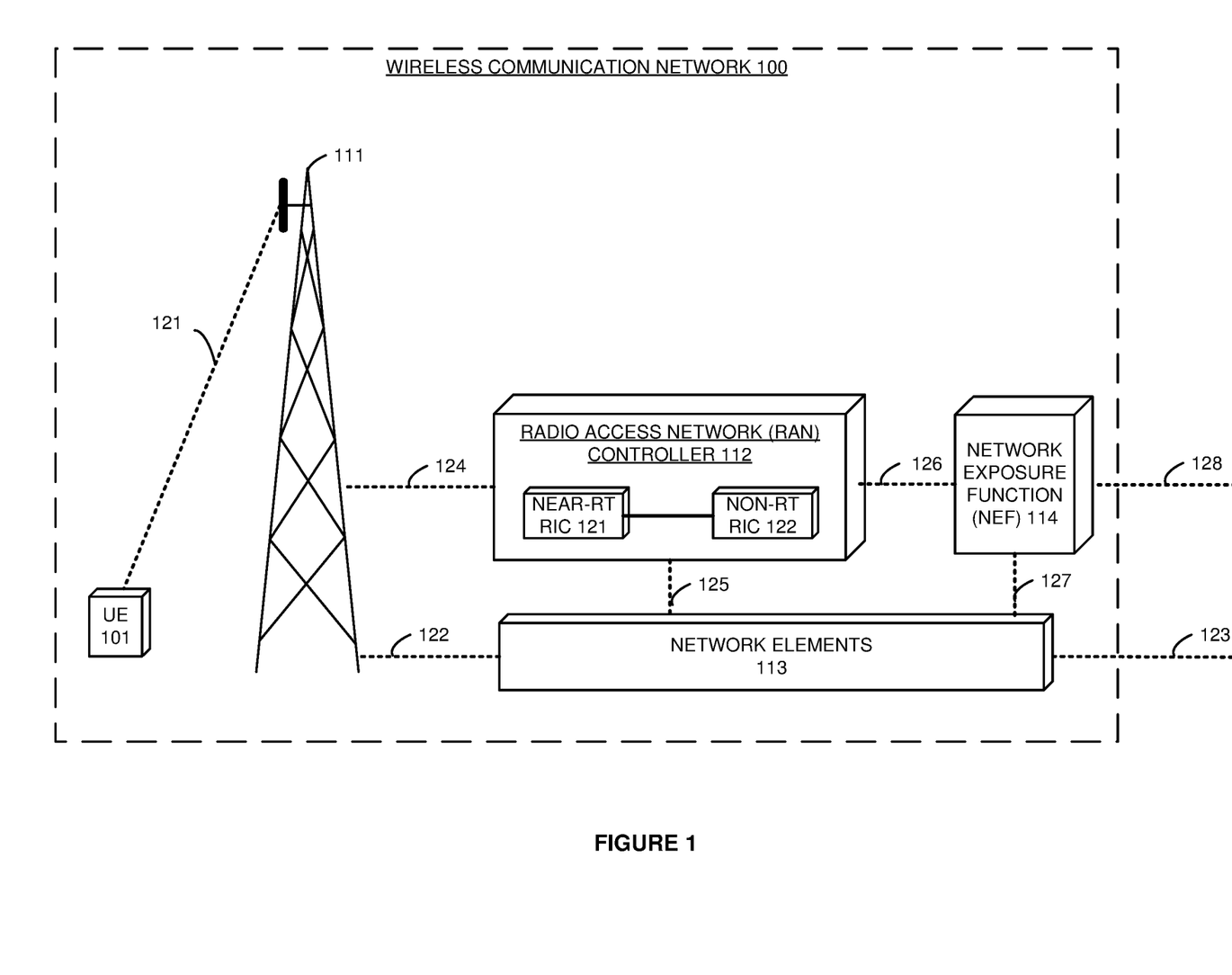
FIG. 1 illustrates a wireless communication network to serve User Equipment (UE) over a Radio Access Network (RAN) and externally expose RAN data.

FIG. 1 illustrates wireless communication network 100 to serve User Equipment (UE) 101 over Radio Access Network (RAN) 111 and externally expose RAN data. The wireless communication service comprises machine-control, internet-access, media-streaming, social-networking, and the like. UE 101 comprises a computer, phone, vehicle, sensor, robot, or some other data appliance with wireless communication circuitry. Wireless communication network 100 comprises Radio Access Network (RAN) 111, RAN controller 112, network elements 113, and Network Exposure Function (NEF) 114. RAN controller 112 comprises Near-Real Time RAN Intelligent Controller (near-RT RIC) 121 and Non-Real Time (non-RT) RIC 122 that communicate over an A1 link. Wireless communication network 100 is simplified and typically includes more UEs, RANs, RICs, and network elements than shown.

Various examples of network operation and configuration are described herein. In some examples, RAN controller 112 controls RAN 111 over E2 link 124, and in response, RAN 111 serves UE 101 over wireless link 121. RAN controller 112 identifies RAN data that characterizes the RAN service-delivery to UE 101. RAN controller 112 transfers the RAN data to NEF 114 over NX link 126. NEF 114 receives the RAN data that was transferred by RAN controller 112. NEF 114 exposes the RAN data to network elements 113 and to external data systems. The RAN data exposure to the external data systems typically occurs through an Application Function (AF). Advantageously, RICs 121-122 and NEF 114 effectively interact to serve UE 101. Moreover, the external data systems efficiently control wireless data services for UE 101 through NEF 114 and RICs 121-122.

In some examples, near-RT RIC 121 executes X-applications like mobility management, admission control, and interference management. The X-applications generate RAN data. Near-RT RIC 121 transfers the RAN data that was generated by the X-applications to NEF 114. NEF 114 receives this RAN data from near-RT RIC 121 and exposes the RAN data that was generated by the X-applications to network elements 113 and to external data systems.

In some examples, near-RT RIC 121 controls a Centralized Unit (CU) and/or a Distributed Unit (DU) in RAN 111. The CU and/or DU generate RAN data. Near-RT RIC 121 transfers the RAN data that was generated by the CU and/or DU to NEF 114. NEF 114 receives this RAN data from near-RT RIC 121 and exposes the RAN data that was generated by the CU and/or DU to network elements 113 and to external data systems.

In some examples, near-RT RIC 121 controls a Radio Resource Control (RRC), Service Data Adaption Protocol (SDAP), Packet Data Convergence Protocol (PDCP), Radio Link Control (RLC), Media Access Control (MAC), and/or Physical Layer (PHY) in RAN 111. At least one of the RRC, SDAP, PDCP, RLC, MAC, and PHY generate RAN data. Near-RT RIC 121 transfers the RAN data that was generated by the RRC, SDAP, PDCP, RLC, MAC, and and/or PHY to NEF 114. NEF 114 receives this RAN data from near-RT RIC 121 and exposes the RAN data that was generated by the RRC, SDAP, PDCP, RLC, MAC, and and/or PHY to network elements 113 and to external data systems.

UE 101 wirelessly communicates with RAN 111 over technologies like Institute of Electrical and Electronic Engineers (IEEE) 802.11 (WIFI), Fifth Generation New Radio (5GNR), Long Term Evolution (LTE), Low-Power Wide area Network (LP-WAN), or some other wireless communication protocol. RAN 111, RAN controller 112, network elements 113, and NEF 114 communicate over metallic wiring, glass fibers, radio channels, or some other communication media. The data links use IEEE 802.3 (Ethernet), Time Division Multiplex (TDM), Data Over Cable System Interface Specification (DOCSIS), Internet Protocol (IP), General Packet Radio Service Transfer Protocol (GTP), virtual switching, inter-processor communication, bus interfaces, WIFI, 5GNR, LTE, and/or some other data communication protocols. UE 101 and RAN 111 comprise radios. UE 101, RAN 112, network elements 113, and NEF 114 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
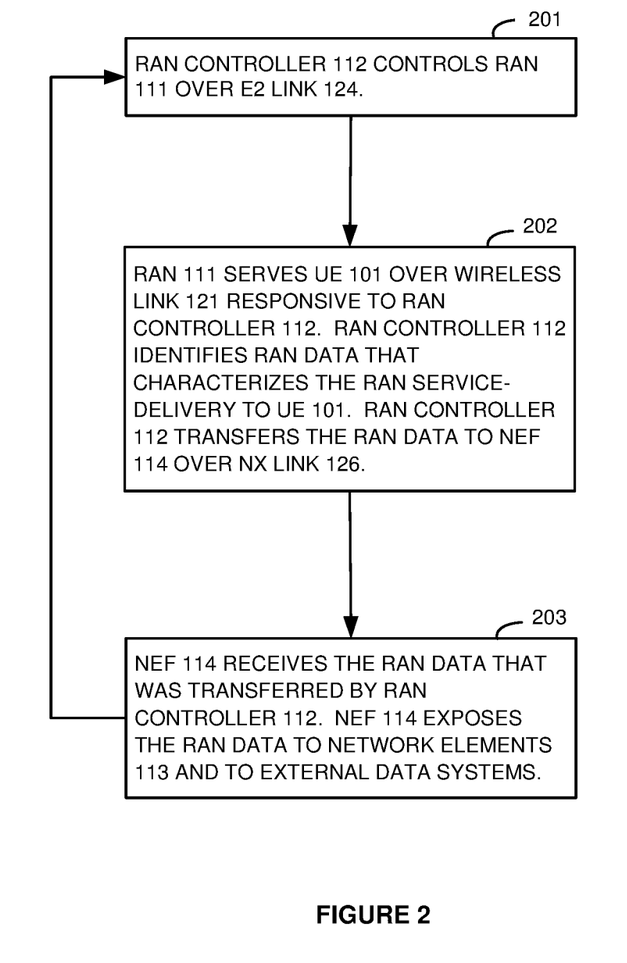
FIG. 2 illustrates an exemplary operation of the wireless communication network to serve the UE over the RAN and externally expose the RAN data.

FIG. 2 illustrates an exemplary operation of wireless communication network 100 to serve UE 101 over RAN 111 and externally expose the RAN data. The operation may vary in other examples. RAN controller 112 controls RAN 111 over E2 link 124 (201). For example, an admission control X-application in controller 112 may allow UE 101 to attach to RAN 111. RAN 111 serves UE 101 over wireless link 121 responsive to RAN controller 112 (202). RAN controller 112 identifies RAN data that characterizes the RAN service-delivery to UE 101 (202). RAN controller 112 transfers the RAN data to NEF 114 over NX link 126 (202). NEF 114 receives the RAN data that was transferred by RAN controller 112 (203). NEF 114 exposes the RAN data to network elements 113 and to external data systems (203).

Figure 3:
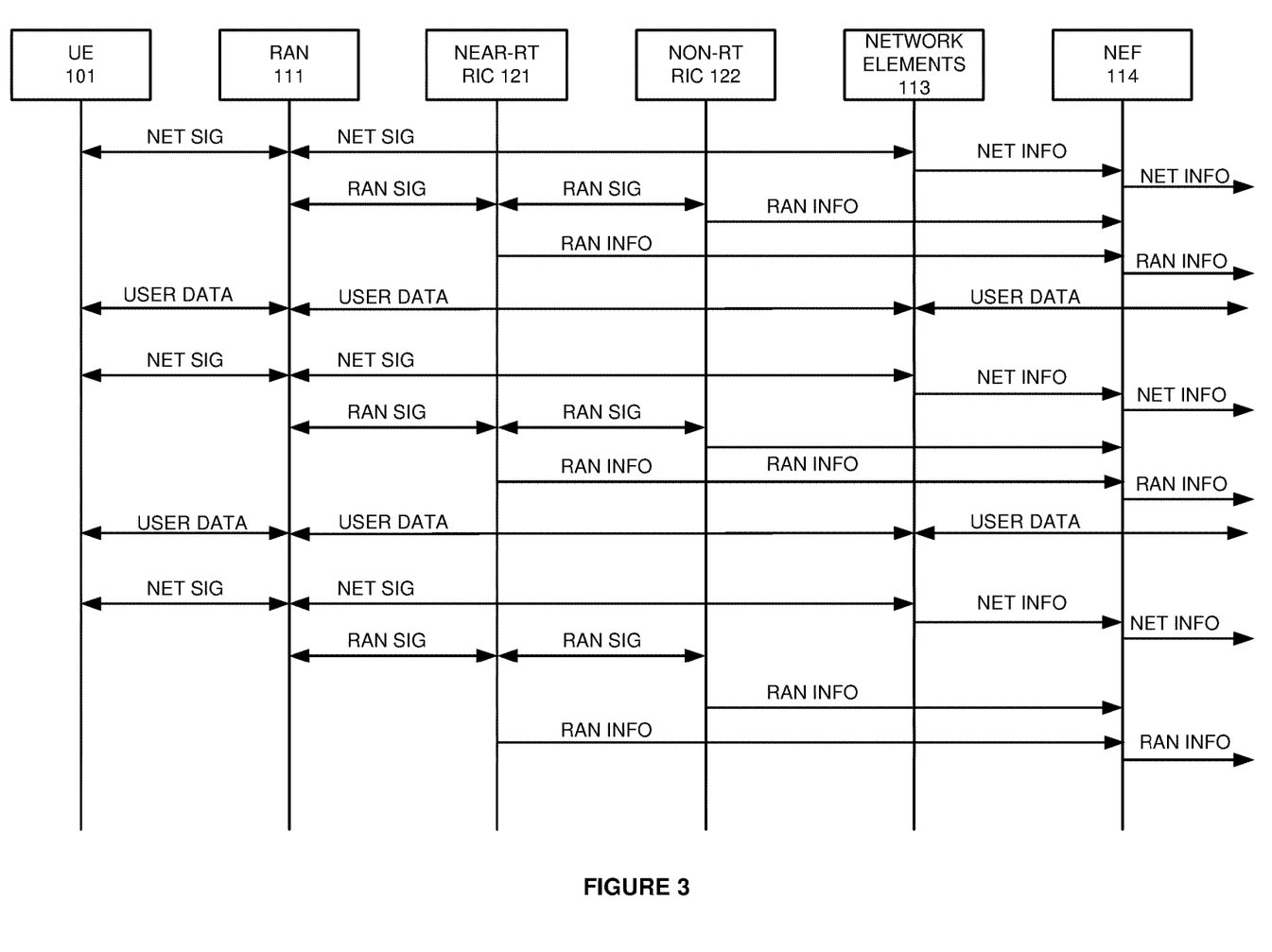
FIG. 3 illustrates an exemplary operation of the wireless communication network to serve the UE over the RAN and externally expose the RAN data.

FIG. 3 illustrates an exemplary operation of wireless communication network 100 to serve UE 101 over RAN 111 and externally expose the RAN data. The operation may vary in other examples. UE 101 and RAN 111 wirelessly exchange network signaling (NET SIG). RAN 111 and network elements 113 wirelessly exchange corresponding network signaling to serve UE 101. In response, network elements 113 transfer network information (NET INFO) to NEF 114 where the network information characterizes the service-delivery to UE 101. NEF 114 exposes the network information to external data systems and possibly to network elements 113. Contemporaneously with the exchange of the network signaling, RAN 111 and near-RT RIC 121 exchange RAN signaling to serve UE 101. Near-RT RIC 121 and Non-RT RIC exchange corresponding RAN signaling to serve UE 101. In response, RICs 121-122 transfer RAN information (RAN INFO) to NEF 114 where the RAN information characterizes the service-delivery to UE 101. NEF 114 exposes the RAN information to external data systems and possibly to network elements 113. In response to the network signaling and the RAN signaling, UE 101 and RAN 111 wirelessly exchange user data. RAN 111 and network elements 113 exchange the user data. Network elements 113 exchange the user data with external data systems. The process repeats as more network and RAN signaling are exchanged. More network and RAN information are transferred to NEF 114. NEF 114 exposes more network and RAN information to external data systems. As more user data is exchanged, and the process repeats again.

Figure 4:
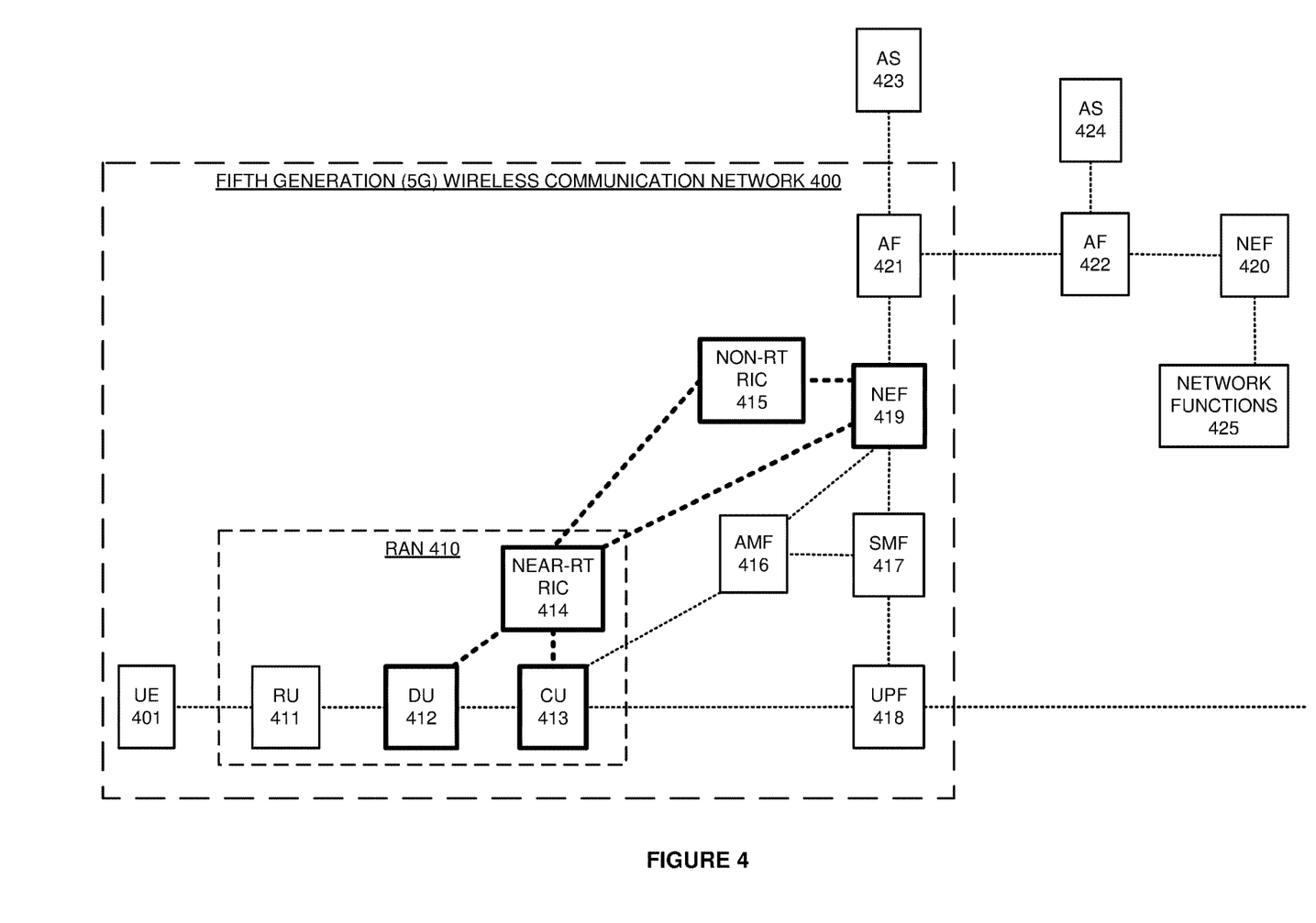
FIG. 4 illustrates a Fifth Generation (5G) wireless communication network to serve a UE over a RAN and externally expose RAN data.

FIG. 4 illustrates Fifth Generation (5G) wireless communication network 400 to serve UE 401 over RAN 410 and externally expose RAN data. 5G wireless communication network 400 comprises an example of wireless communication network 100, although network 100 may differ. 5G wireless communication network 400 comprises: UE 401, RAN 410, non-Real Time Radio Intelligent Controller (non-RT RIC) 415, Access and Mobility Management Function (AMF) 416, Session Management Function (SMF) 417, User Plane Function (UPF) 418, Network Exposure Function (NEF) 419, and Application Function (AF) 421. RAN 410 comprises Radio Unit (RU) 411, Distributed Unit (DU) 412, Centralized Unit (CU) 413, and near-Real Time Radio Intelligent Controller (near-RT RIC) 414. Other network elements like Policy Control Function (PCF) and Unified Data Manager (UDM) are typically present but omitted for clarity.

UE 401 and RU 411 wirelessly exchange 5GNR signaling over a 5GNR link. RU 411 and DU 412 exchange corresponding 5GNR signaling over a fronthaul link. DU 412 and CU 413 exchange corresponding 5GNR signaling over a midhaul link. CU 413 and AMF 416 exchange corresponding N2 signaling over a backhaul link. AMF 416 authenticates UE 401 and authorizes UE 401 for wireless data services. AMF 416 signals SMF 417 to serve UE 401, and SMF 417 configures UPF 418 to deliver data service to UE 401. AMF 416 signals CU 413 to serve UE 401, and CU configures DU 412 and RU 411 to deliver data services to UE 401.

Contemporaneously, AS 424 transfers service instructions for UE 401 to AF 422, and AF 422 transfers the service instructions to NEF 420 over a northbound Application Programming Interface (API). NEF 420 transfers the service instructions to NEF 419 over AFs 421-422 and their APIs. NEF 420, AF 422, AS 424, and network functions 425 may comprise a home network for UE 401. Alternatively, AS 423 transfers service instructions for UE 401 to AF 421, and AF 421 transfers the service instructions to NEF 419 over its northbound API. AS 423 may comprise a virtual network for UE 401. NEF 419 exposes the service instructions to near-RT RIC 414, non-RT RIC 415, AMF 416, SMF 417, and typically other network elements like PCFs and UDMs.

Contemporaneously, RICs 414-415 execute X-applications like mobility management, admission control, and interference management. In response, non-RT RIC 415 and near RT RIC 414 exchange RAN signaling for UE 401 over their A1 link. Near RT RIC 414 and CU 413 exchange corresponding RAN signaling for UE 401 over their E2 link. Near RT RIC 414 and DU 412 exchange corresponding RAN signaling for UE 401 over their E2 link. In response to the signaling from AMF 416 and near-RT RIC 414, UE 401 and RU 411 wirelessly exchange user data. RU 411 and DU 412 exchange the user data. DU 412 and CU 413 exchange the user data. CU 413 and UPF 418 exchange the user data. UPF 418 and external data systems exchange the user data.

DU 412 and CU 413 generate RAN data that characterizes the wireless data service for UE 401. DU 412 and CU 413 transfer the RAN data to near-RT RIC 414, and near-RT RIC 414 also generates RAN data that characterizes the wireless data service for UE 401. Near-RT RIC 414 transfers the RAN data to NEF 419. Non-RT RIC 414 may also generate RAN data that characterizes the wireless data service for UE 401 and transfer this RAN data to NEF 419. AMF 416 and SMF 417 generate network data that characterizes the wireless data service for UE 401 and transfer the network data to NEF 419. NEF 419 may expose the RAN data and the network data to AS 423 over AF 421. NEF 419 may expose the RAN data and the network data to AS 424 over AFs 421-422 and NEF 420. In response to the RAN data and the network data, AS 423-424 generate and transfer new service instructions for UE 401 to AFs 421-422.

Figure 5:
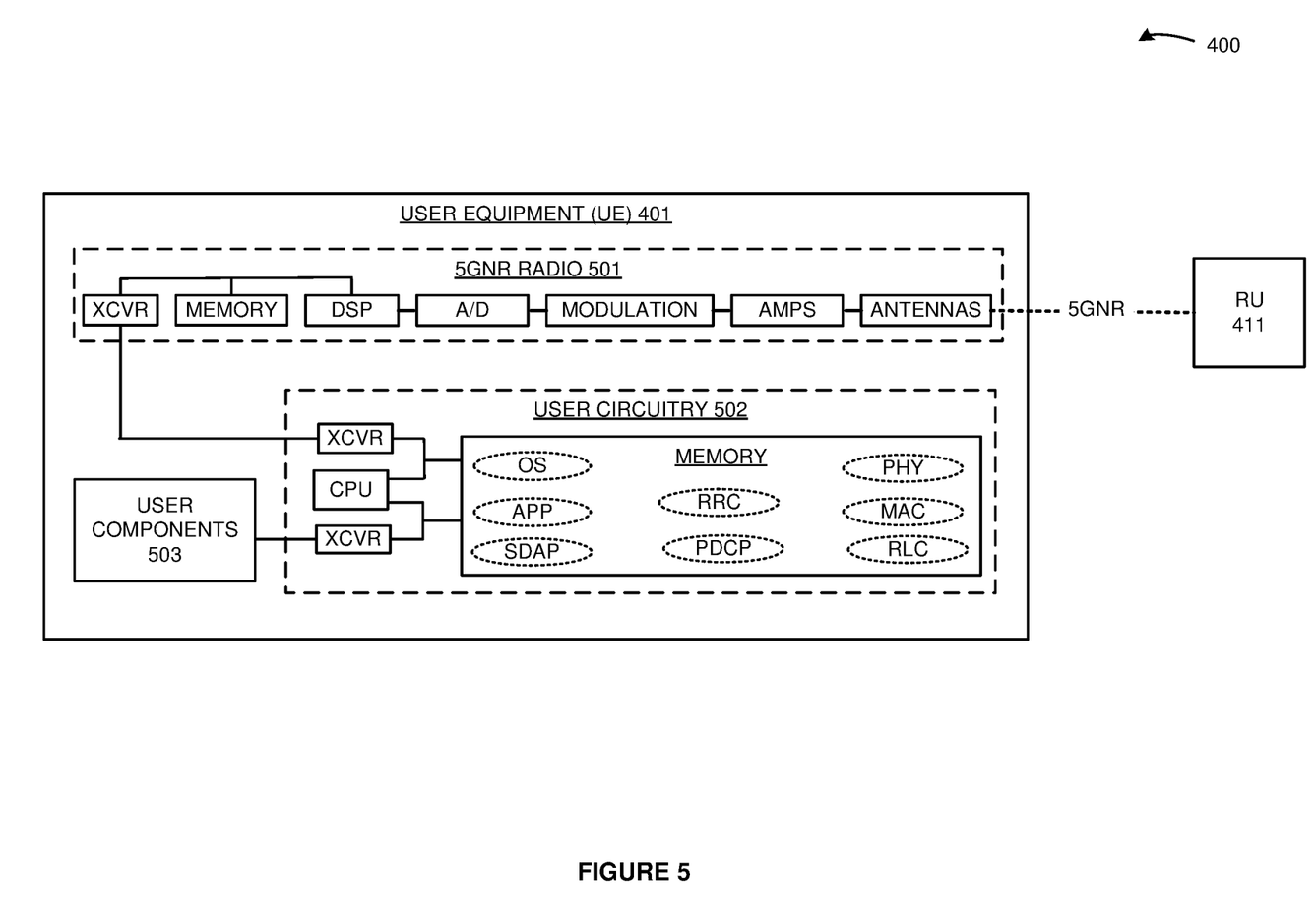
FIG. 5 illustrates a UE in the 5G wireless communication network.

FIG. 5 illustrates UE 401 in 5G wireless communication network 400. UE 401 comprises an example of UE 101, although UE 101 may differ. UE 401 comprises 5GNR radio 501, user circuitry 502, and user components 503. 5GNR radio 501 comprises antennas, amplifiers, filters, modulation, analog-to-digital interfaces, DSP, memory, and transceivers that are coupled over bus circuitry. User circuitry 502 comprises memory, CPU, user interfaces and components, and transceivers that are coupled over bus circuitry. The memory in user circuitry 502 stores an operating system (OS), user apps (APP), and network applications for 5GNR like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radio 501 are wirelessly coupled to RU 411 over a link. Transceivers (XCVRs) in 5GNR radio 501 are coupled to transceivers in user circuitry 502. Transceivers in user circuitry 502 are coupled to user components 503 like displays, controllers, interfaces, and memory. The CPU in user circuitry 502 executes the operating system, user apps, and network applications to exchange network signaling and user data with RU 411.

Figure 6:
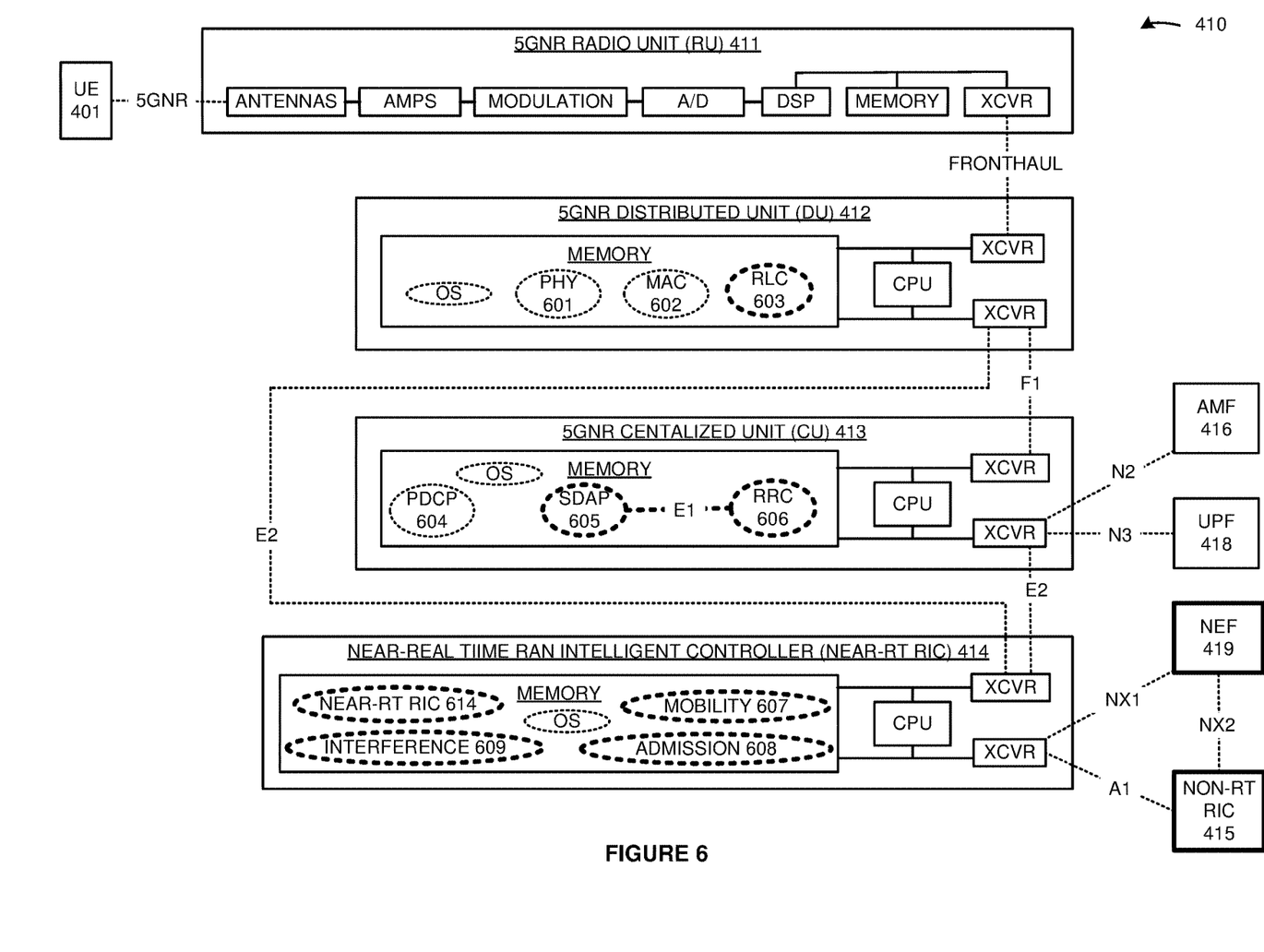
FIG. 6 illustrates a RAN in the 5G wireless communication network.

FIG. 6 illustrates Radio Access Network (RAN) 410 in 5G wireless communication network 400. RAN 410 comprises an example of RAN 111, although RAN 111 may differ. RAN 411 comprises RU 411, DU 412, CU 413, and near-RT RIC 414. CU 413 and near-RT RIC 414 may be integrated together in some examples. 5GNR RU 411 comprises antennas, amplifiers, filters, modulation, analog-to-digital interfaces, DSP, memory, and transceivers that are coupled over bus circuitry. The memory in RU 411 may store a lower portion of a 5GNR PHY. 5GNR DU 412 comprises memory, CPU, and transceivers that are coupled over bus circuitry. The memory in 5GNR DU 412 stores an operating system and 5GNR network applications like PHY 601, MAC 602, and RLC 603. 5GNR CU 413 comprises memory, CPU, and transceivers that are coupled over bus circuitry. The memory in 5GNR CU 413 stores an operating system and 5GNR network applications like PDCP 604, SDAP 605, and RRC 606. Near RT-RIC 414 comprises memory, CPU, and transceivers that are coupled over bus circuitry. The memory in Near RT-RIC 414 stores an operating system and RAN applications like mobility management 607, admission control 608, interference management 609, and near RT-RIC 614. The DSP and CPU in RAN 410 execute the operating systems, 5GNR applications, and RAN applications to exchange network signaling and user data with UE 401, AMF 416, and UPF 418. The antennas in 5GNR RU 411 are wirelessly coupled to UE 401 over a 5GNR link. Transceivers in 5GNR RU 411 are coupled to transceivers in 5GNR DU 412 over a fronthaul link. Transceivers in 5GNR DU 412 are coupled to transceivers in 5GNR CU 413 over an F1 link. Transceivers in 5GNR DU 412 couple RLC 603 to transceivers in near RT-RIC 614 over an E2 link. Transceivers in 5GNR CU 413 couple RRC 606 to transceivers in near RT-RIC 614 over an E2 link. In 5GNR CU 413, SDAP 605 and RRC 606 are coupled over an E1 link. Transceivers in 5GNR CU 413 are coupled to AMF 416 over an N2 link and to UPF 418 over an N3 link. Transceivers in near-RT RIC 414 are coupled to non-RT RIC 415 over an A1 link and to NEF 419 over an NX1 link.

Figure 7:
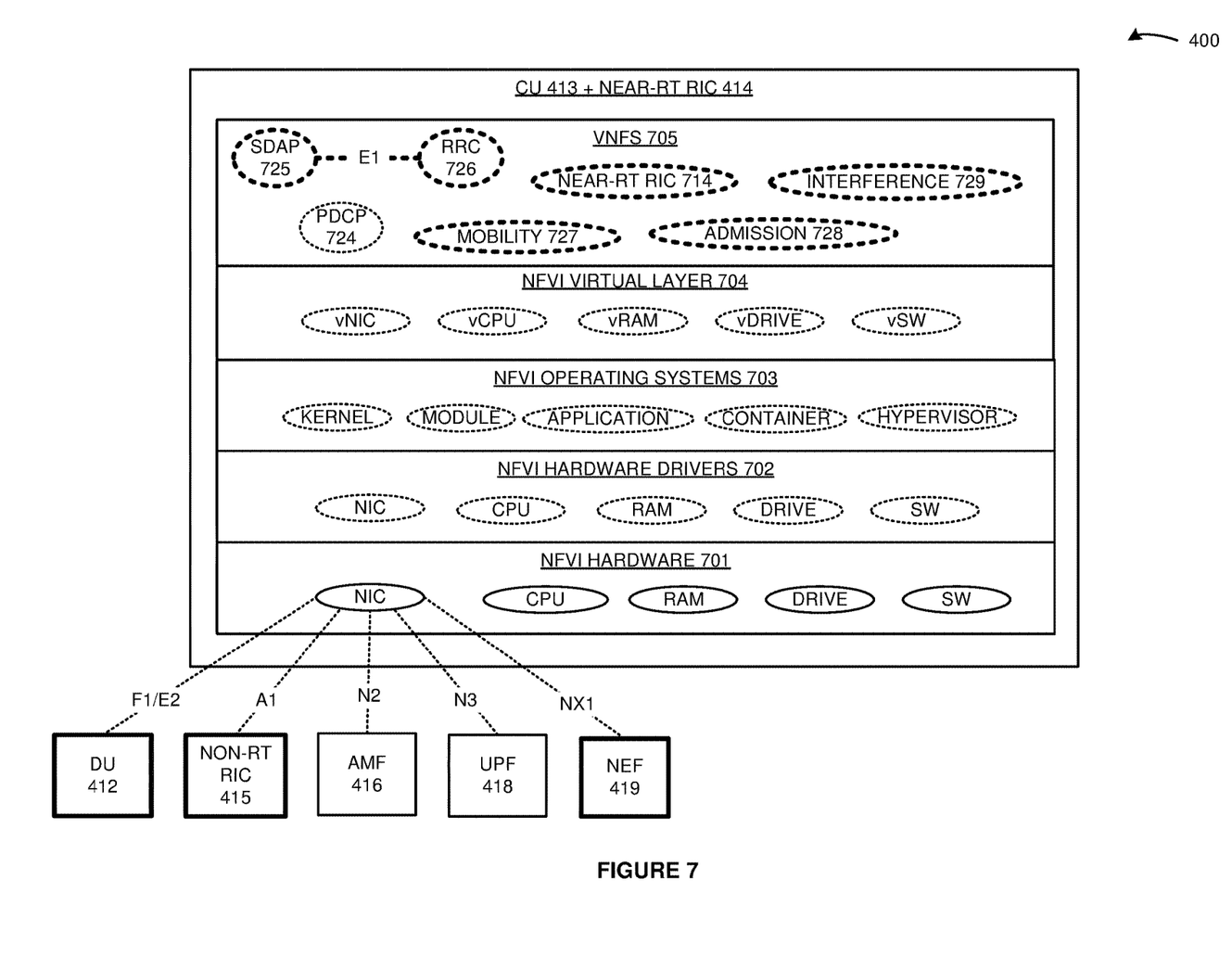
FIG. 7 illustrates a Centralized Unit (CU) in the 5G wireless communication network.

FIG. 7 illustrates Centralized Unit (CU) 413 and near Real-Time Radio Intelligent Controller (near-RT RIC) 414 in 5G wireless communication network 400. In this example, CU 413 and near-RT RIC 414 are integrated together although such integration is not required. CU 413 and near-RT RIC 414 comprise Network Function Virtualization Infrastructure (NFVI) hardware 701, NFVI hardware drivers 702, NFVI operating systems 703, NFVI virtual layer 704, and Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. VNFs 705 comprise PDCP 724, SDAP 725, RRC 726, mobility management 727, admission control 728, interference management 729, and near-RT RIC application 714. CU 413 and near RT RIC 414 may be located at a single site or be distributed across multiple geographic locations. The NIC transceivers in NFVI hardware 701 are coupled to: DU 412 over F1 links and E2 links, non-RT RIC 415 over an A1 link, AMF 416 over an N2 link, UPF 418 over an N3 link, and NEF 419 over an NX1 link. NFVI hardware 701 executes NFVI hardware drivers 702, NFVI operating systems 703, NFVI virtual layer 704, and VNFs 705 to form and operate CU 413 and near RT-RIC 414.

Figure 8:
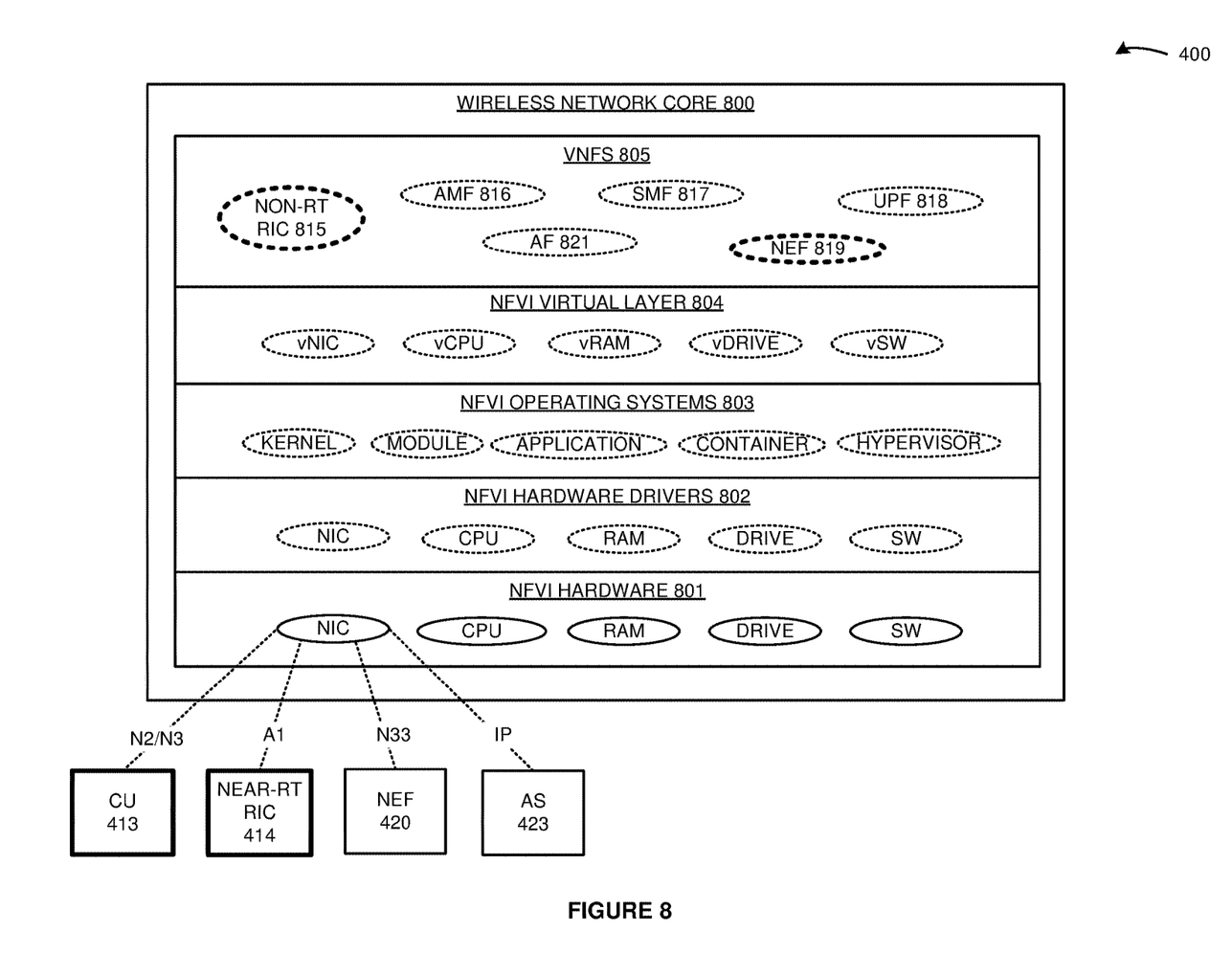
FIG. 8 illustrates a wireless network core in the 5G wireless communication network.

FIG. 8 illustrates wireless network core 800 in 5G wireless communication network 400. Wireless network core 800 comprises an example of network elements 113, NEF 114, and non-RT RIC 122, although network elements 113, NEF 114, and/or non-RT RIC 122 may differ. Wireless network core 800 comprises Network Function Virtualization Infrastructure (NFVI) hardware 801, NFVI hardware drivers 802, NFVI operating systems 803, NFVI virtual layer 804, and Virtual Network Functions (VNFs) 805. Non-RT RIC 415 is integrated with AMF 416, SMF 417, UPF 418, NEF 419, and AF 421 in this example, but in alternative examples, non-RT RIC 815 may be located in a different NFVI or on a different computer platform like a service orchestrator. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. VNFs 805 comprise non-Real Time Radio Intelligent Controller (non-RT RIC) application 815, Access and Mobility Management Function (AMF) 816, SMF Session Management Function (SMF) 817, User Plane Function (UPF) 818, Network Exposure Function (NEF 819), and Application Function (AF) 821. Other VNFs like Authentication Server Function (AUSF) and Network Repository Function (NRF) are typically present but are omitted for clarity. Wireless network core 800 may be located at a single site or be distributed across multiple geographic locations. The NIC transceivers in NFVI hardware 801 are coupled to: CU 413 over N2/N3 links, near-RT RIC 414 over an A1 link, NEF 419 over an N33 link, and AS 423 over an IP link. NFVI hardware 801 executes NFVI hardware drivers 802, NFVI operating systems 803, NFVI virtual layer 804, and VNFs 805 to form and operate non-RT RIC 415, AMF 416, SMF 417, UPF 418, NEF 419, and AF 421.

Figure 9:
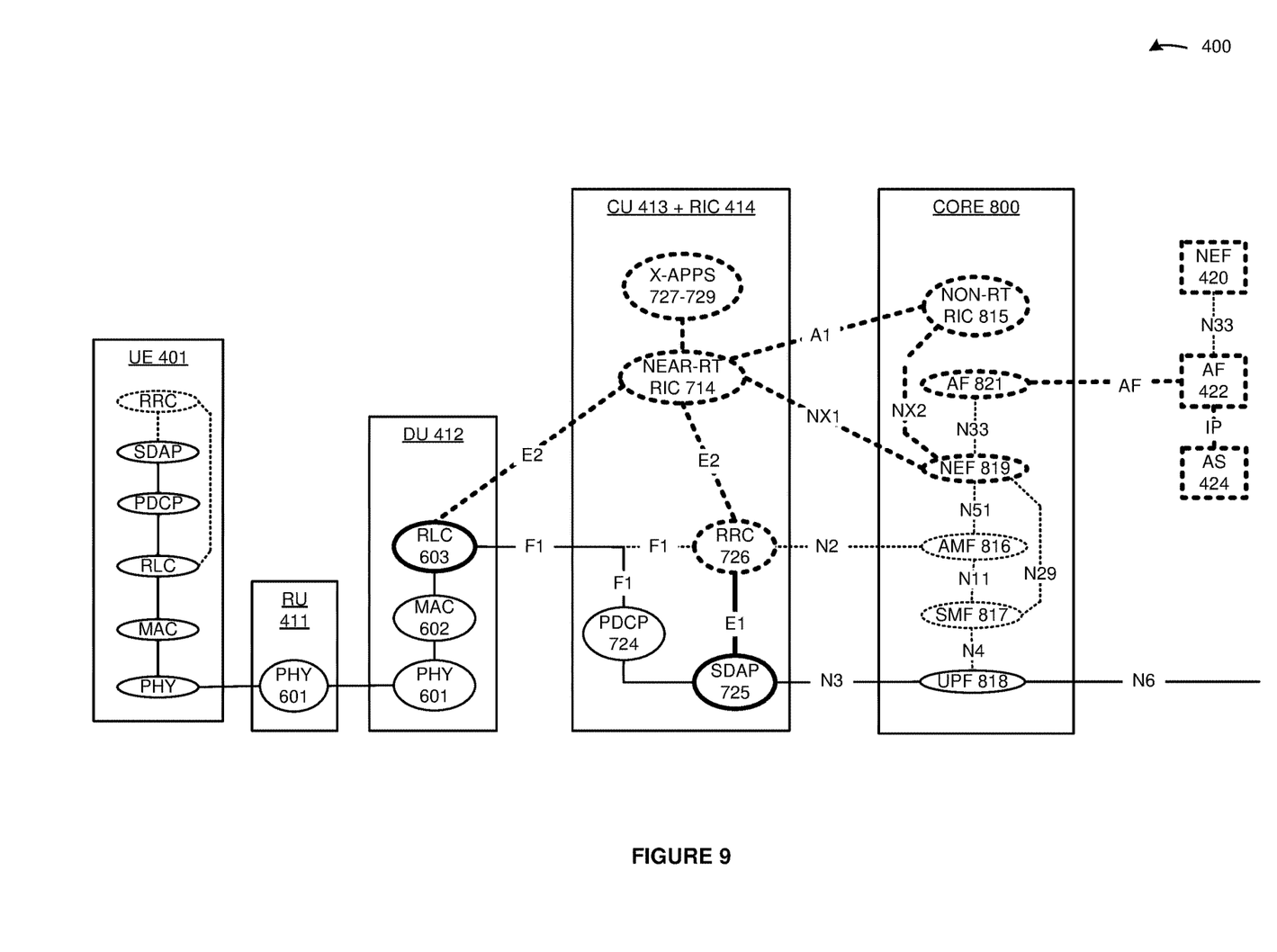
FIG. 9 illustrates an exemplary operation of the 5G wireless communication network to serve the UE over the RAN and externally expose the RAN data.

FIG. 9 illustrates an exemplary operation of 5G wireless communication network 400 to serve UE 401 over RAN 410 and externally expose the RAN data. The operation may vary in other examples. On FIG. 9, the user-plane has solid lines, and the control-plane has dotted-lines (and combined user/control planes have solid lines). In this example, the PHY is split between a lower layer in RU 411 and a higher layer in DU 412. In this example, CU 413 and near-RT RIC 414 are integrated together as shown in FIG. 8.

The RRC application in UE 401 attaches to RRC VNF 726 in CU 413 over the network applications in UE 401, RU 411, and DU 412 (RLC, MAC, PHY). RRC VNF 726 and AMF VNF 816 exchange corresponding N2 signaling to register UE 401. AMF VNF 816 authenticates UE 401 and authorizes UE 401 for wireless data services. AMF VNF 816 signals SMF VNF 817 to serve UE 401. SMF VNF 817 signals UPF VNF 818 to deliver data services to UE 401. AMF VNF 816 signals RRC VNF 726 to serve UE 401. RRC VNF 726 configures the network applications in DU 412 and RU 411 (PDCP, RLC, MAC, PHY) to deliver the data services to UE 401. RRC VNF 726 signals the RRC application in UE 401 to configure the network applications (SDAP, PDCP, RLC, MAC, PHY) in UE 401 to consume the data services.

Contemporaneously, AS 424 transfers service instructions for UE 401 to AF 422. AF 422 transfers the service instructions to NEF 420. NEF 420 transfers the service instructions to NEF VNF 819 over AF 422 and AF VNF 821 and their N33 links. NEF VNF 819 exposes the service instructions to near-RT RIC VNF 714, non-RT RIC VNF 815, AMF VNF 816, SMF VNF 817, and typically other network elements like PCFs and UDMs.

Contemporaneously, near-RT RIC VNF 714 executes X-application VNFs 727-729. In response, non-RT RIC VNF 815 and near-RT RIC VNF 714 exchange RAN signaling for UE 401 over their A1 link. Near RT RIC VNF 714 and RRC VNF 726 exchange corresponding RAN signaling for UE 401 over their E2 link. Near-RT RIC VNF 714 and RLC application 603 exchange corresponding RAN signaling for UE 401 over their E2 link.

In response to the N2 signaling from AMF VNF 816 and the E2 signaling from near-RT RIC VNF 714, UE 401 and SDAP VNF 725 in CU 413 exchange user data over the network applications (PDCP, RLC, MAC, PHY) in UE 401, RU 411, and DU 412. SDAP VNF 725 and UPF VNF 818 exchange the user data over an N3 link. UPF VNF 818 and external data systems exchange the user data over an N6 link.

The network applications in RU 411 and DU 412 (PHY 601, MAC 602, RLC 603) generate RAN data that characterizes the wireless data service for UE 401. This RAN data comprises radio signal status, power levels, scheduling information, link data, and the like. VNFs 724-729 and 714 in RIC 414 (PDCP 724, SDAP 725, RRC 726, X-APPs 727-729, RIC 714) also generate RAN data that characterizes the wireless data service for UE 401. This RAN data comprises mobility status, throughput, slice information, and the like. The network applications and VNFs 724-729 transfer their RAN data to near-RT RIC VNF 714. Near-RT RIC VNF 714 also generates RAN data that characterizes the wireless data service for UE 401. Near-RT RIC VNF 714 transfers the RAN data to NEF VNF 819 over the NX1 link.

Non-RT RIC VNF 815 also generates RAN data that characterizes the wireless data service for UE 401 and transfers this RAN data to NEF VNF 819 over the NX2 links. The NX1 link could be similar to the N2 link between RRC VNF 726 and AMF VNF 816. The NX2 link could be similar to the N29 link between SMF VNF 816 and NEF VNF 819. AMF VNF 816 and SMF VNF 817 generate network data that characterizes the wireless data service for UE 401 and transfer the network data to NEF VNF 819 over their N51 and N29 links.

NEF VNF 819 exposes the RAN data and the network data to NEF 420 over AF VNF 821, AF 422, and their N33 links. NEF 420 exposes the RAN data and the network data to AS 424 over AF 422 In response to the RAN data and the network data, AS 424 generates and transfers new service instructions for UE 401 to NEF 420 over AF 422. NEF 420 transfers the new service instructions for UE 401 to NEF VNF 819 over AF 422 and AF VNF 821. The operation repeats as new network signaling, RAN signaling, and user data are exchanged for UE 401, and new network data and RAN data are exposed to AS 424 which responsively generates more service instructions.

The wireless data network circuitry described above comprises computer hardware and software that form special-purpose networking circuitry to serve UEs over RANs and externally expose RAN data. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs over RANs and externally expose RAN data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to provide a wireless communication service to a User Equipment (UE) responsive to an Application Server (AS) that is external to the wireless communication network, the method comprising:

a Network Exposure Function (NEF) receiving a Radio Access Network (RAN) instruction from the AS that is external to the wireless communication network, wherein the RAN instruction controls the wireless communication service for the UE;

the NEF transferring the RAN instruction to the RAN;

the RAN receiving the RAN instruction, and in response, delivering the wireless communication service to the UE based on the RAN instruction from the AS;

the RAN transferring RAN information that characterizes the RAN delivery of the wireless communication service to the UE based on the RAN instruction from the AS; and the NEF receiving the RAN information, and in response, transferring the RAN information to the AS that is external to the wireless communication network, wherein the RAN information characterizes the RAN delivery of the wireless communication service to the UE based on the RAN instruction from the AS.

2. The method of claim 1 wherein the RAN delivering the wireless communication service to the UE based on the RAN instruction from the AS comprises performing mobility management.

3. The method of claim 1 wherein the RAN delivering the wireless communication service to the UE based on the RAN instruction from the AS comprises performing admission control.

4. The method of claim 1 wherein the RAN delivering the wireless communication service to the UE based on the RAN instruction from the AS comprises performing interference management.

5. The method of claim 1 wherein the RAN delivering the wireless communication service to the UE based on the RAN instruction from the AS comprises controlling a Radio Resource Control (RRC).

6. The method of claim 1 wherein the RAN delivering the wireless communication service to the UE based on the RAN instruction from the AS comprises controlling a Service Data Adaption Protocol (SDAP).

7. The method of claim 1 wherein the RAN delivering the wireless communication service to the UE based on the RAN instruction from the AS comprises controlling a Packet Data Convergence Protocol (PDCP).

8. The method of claim 1 wherein the RAN delivering the wireless communication service to the UE based on the RAN instruction from the AS comprises controlling a Radio Link Control (RLC).

9. The method of claim 1 wherein the RAN delivering the wireless communication service to the UE based on the RAN instruction from the AS comprises controlling a Media Access Control (MAC).

10. The method of claim 1 wherein the RAN delivering the wireless communication service to the UE based on the RAN instruction from the AS comprises controlling a Physical Layer (PHY).

11. The method of claim 1 wherein the RAN delivering the wireless communication service to the UE based on the RAN instruction from the AS comprises controlling a RAN Intelligent Controller (RIC).

12. The method of claim 1 wherein the RAN delivering the wireless communication service to the UE based on the RAN instruction from the AS comprises controlling a RAN Intelligent Controller (RIC) X-application.

13. The method of claim 1 wherein the RAN delivering the wireless communication service to the UE based on the RAN instruction from the AS comprises controlling a RAN Centralized Unit (CU).

14. The method of claim 1 wherein the RAN delivering the wireless communication service to the UE based on the RAN instruction from the AS comprises controlling a RAN Distributed Unit (DU).

15. The method of claim 1 wherein the RAN delivering the wireless communication service to the UE based on the RAN instruction from the AS comprises controlling a RAN Radio Unit (RU).

16. A method of operating a wireless communication network to provide a wireless communication service to a User Equipment (UE), the method comprising:
   a Network Exposure Function (NEF) receiving a service instruction for the UE from a data system;
   the NEF transferring the service instruction to a Radio Access Network Intelligent Controller (RIC);
   the RIC receiving the service instruction, and in response, executing an X-application based on the service instruction to deliver the wireless communication service to the UE;
   the RIC transferring service information that characterizes the delivery of the wireless communication service to the UE; and
   the NEF receiving the service information, and in response, exposing the service information to the data system.

17. The method of claim 16 wherein the RIC executing the X-application based on the service instruction to deliver the wireless communication service to the UE comprises performing mobility management.

18. The method of claim 16 wherein the RIC executing the X-application based on the service instruction to deliver the wireless communication service to the UE comprises performing admission control.

19. The method of claim 16 wherein the RIC executing the X-application based on the service instruction to deliver the wireless communication service to the UE comprises performing interference management.

20. A wireless communication network to provide a wireless communication service to a User Equipment (UE) responsive to an Application Server (AS) that is external to the wireless communication network, the wireless communication network comprising:
   a Network Exposure Function (NEF) to receive a Radio Access Network (RAN) instruction from the AS that is external to the wireless communication network, wherein the RAN instruction controls the wireless communication service for the UE;
   the NEF to transfer the RAN instruction to the RAN;
   the RAN to receive the RAN instruction, and in response, deliver the wireless communication service to the UE based on the RAN instruction from the AS;
   the RAN to transfer RAN information that characterizes the RAN delivery of the wireless communication service to the UE based on the RAN instruction from the AS; and
   the NEF to receive the RAN information, and in response, transfer the RAN information to the AS that is external to the wireless communication network, wherein the RAN information characterizes the RAN delivery of the wireless communication service to the UE based on the RAN instruction from the AS.

* * * * *